US011216940B2

(12) United States Patent
Denney et al.

(10) Patent No.: US 11,216,940 B2
(45) Date of Patent: Jan. 4, 2022

(54) METROLOGY-BASED ASSISTED DEFECT RECOGNITION

(71) Applicant: Canon Virginia, Inc., Newport News, VA (US)

(72) Inventors: Bradley Scott Denney, Irvine, CA (US); Yunzhe Zhao, Irvine, CA (US)

(73) Assignee: Canon Virginia, Inc., Newport News, VA (US)

( * ) Notice: Subject to any disclaimer, the term of this patent is extended or adjusted under 35 U.S.C. 154(b) by 59 days.

(21) Appl. No.: 16/845,652

(22) Filed: Apr. 10, 2020

(65) Prior Publication Data

US 2020/0327655 A1    Oct. 15, 2020

Related U.S. Application Data

(60) Provisional application No. 62/834,291, filed on Apr. 15, 2019.

(51) Int. Cl.
*G06T 7/00* (2017.01)

(52) U.S. Cl.
CPC ............ *G06T 7/001* (2013.01); *G06T 7/0006* (2013.01); *G06T 2207/20081* (2013.01); *G06T 2207/30108* (2013.01)

(58) Field of Classification Search
CPC ....... G06T 7/40; G06T 11/001; G06T 19/006; G06T 11/60; G06T 7/0012; G06T 7/70; G06T 2207/30201; G11B 27/036; G11B 27/3081; G06K 9/00335; G06K 9/00288; G06K 9/00375; G06K 9/00268; G06F 9/542

See application file for complete search history.

(56) References Cited

U.S. PATENT DOCUMENTS

| | | | |
|---|---|---|---|
| 7,711,514 B2 | 5/2010 | Park | |
| 8,131,107 B2 | 3/2012 | Sun | |
| 8,248,618 B2 | 8/2012 | Rinn | |
| 9,201,022 B2 | 12/2015 | Hu | |
| 9,417,058 B1 | 8/2016 | Lina | |
| 9,754,374 B1 | 9/2017 | Lina | |
| 2009/0279772 A1* | 11/2009 | Sun | ............................ G06T 7/35 382/141 |

* cited by examiner

*Primary Examiner* — Phuoc H Doan
(74) *Attorney, Agent, or Firm* — Canon U.S.A., Inc. IP Division

(57) ABSTRACT

Some embodiments of systems, devices, and methods obtain a plurality of training images; obtain one or more target regions; generate one or more respective statistical characterizations of the one or more target regions; obtain a test image; locate the one or more target regions on the test image; compare the one or more target regions in the test image to the one or more respective statistical characterizations of the one or more target regions; and detect anomalies in the one or more target regions in the test image based at least in part on the comparison of the one or more target regions in the test image to the one or more respective statistical characterizations of the one or more target regions.

20 Claims, 10 Drawing Sheets

METROLOGY-BASED ASSISTED DEFECT RECOGNITION

CROSS-REFERENCE TO RELATED APPLICATIONS

This application claims the benefit of U.S. Application No. 62/834,291, which was filed on Apr. 15, 2019.

BACKGROUND

Technical Field

This application generally concerns computer vision that detects anomalies in images.

Background

Computer-vision systems can detect visual anomalies in images. For example, nondestructive computer-vision testing techniques can be used to examine the properties of objects without causing damage to the objects. These techniques can be used in a quality-control process to identify defects in the objects.

Existing metrology applications used in non-destructive testing rely on making measurements in images or in volumes of importance to ensure that the structural dimensions are consistent with design tolerances. For example, an x-ray image of a pipeline may check the wall thickness to ensure that the thickness exceeds a certain minimum thickness.

However, there are variations in part placement for imaging, and there are natural variations from part to part due to variations in the manufacturing process. The actual natural variations may or may not be known. Also, while actual measurements against a design specification may be important, in some cases, it may be equally important to be able to detect abnormal variations in the manufactured part. These abnormalities in critical structures may be highlighted to part inspectors so that they may make a determination about whether or not the part is structurally compromised.

SUMMARY

An aspect of the present disclosure provides an anomaly-detection approach to metrology and learns normal manufacturing variations of a component from training images of the component. This enables the highlighting of manufacturing inconsistencies even when the component may be within manufacturing tolerances. The discovery of these inconsistencies can help manufacturing-process reviews and improvements and can also help to determine the effects of changes made to the manufacturing process.

Some embodiments of a device comprise one or more computer-readable storage media and one or more processors. The one or more processors are configured to cause the device to obtain a plurality of training images; obtain one or more target regions; generate one or more respective statistical characterizations of the one or more target regions; obtain a test image; locate the one or more target regions on the test image; compare the one or more target regions in the test image to the one or more respective statistical characterizations of the one or more target regions; and detect anomalies in the one or more target regions in the test image based at least in part on the comparison of the one or more target regions in the test image to the one or more respective statistical characterizations of the one or more target regions.

Some embodiments of a method comprise obtaining a plurality of training images that includes a reference image; selecting a target region in the reference image; selecting respective target regions in the other training images in the plurality of training images, wherein the respective target regions in the other training images correspond to the target region in the reference image; selecting a pair of key points in the target region in the reference image; selecting respective pairs of key points in the other training images, wherein the respective pairs of key points in the other training images correspond to the pair of key points in the target region in the reference image; and measuring respective distances between the key points in the pairs of key points in the training images.

Some embodiments of one or more computer-readable storage media store instructions that, when executed by one or more computing devices, cause the one or more computing devices to perform operations that comprise obtaining a reference image; selecting a pair of key points in the reference image; measuring a distance between the key points in the pair of key points in the reference image; obtaining a test image; selecting a pair of key points in the test image, wherein each key point in the pair of key points in the test image corresponds to a respective key point in the pair of key points in the reference image; measuring a distance between the key points in the pair of key points in the test image; and detecting an anomaly in the test image based at least in part on the distance between the key points in the pair of key points in the test image.

BRIEF DESCRIPTION OF EXEMPLARY EMBODIMENTS

The following paragraphs describe certain explanatory embodiments. Other embodiments may include alternatives, equivalents, and modifications. Additionally, the explanatory embodiments may include several novel features, and a particular feature may not be essential to some embodiments of the devices, systems, and methods that are described herein.

Figure 1:
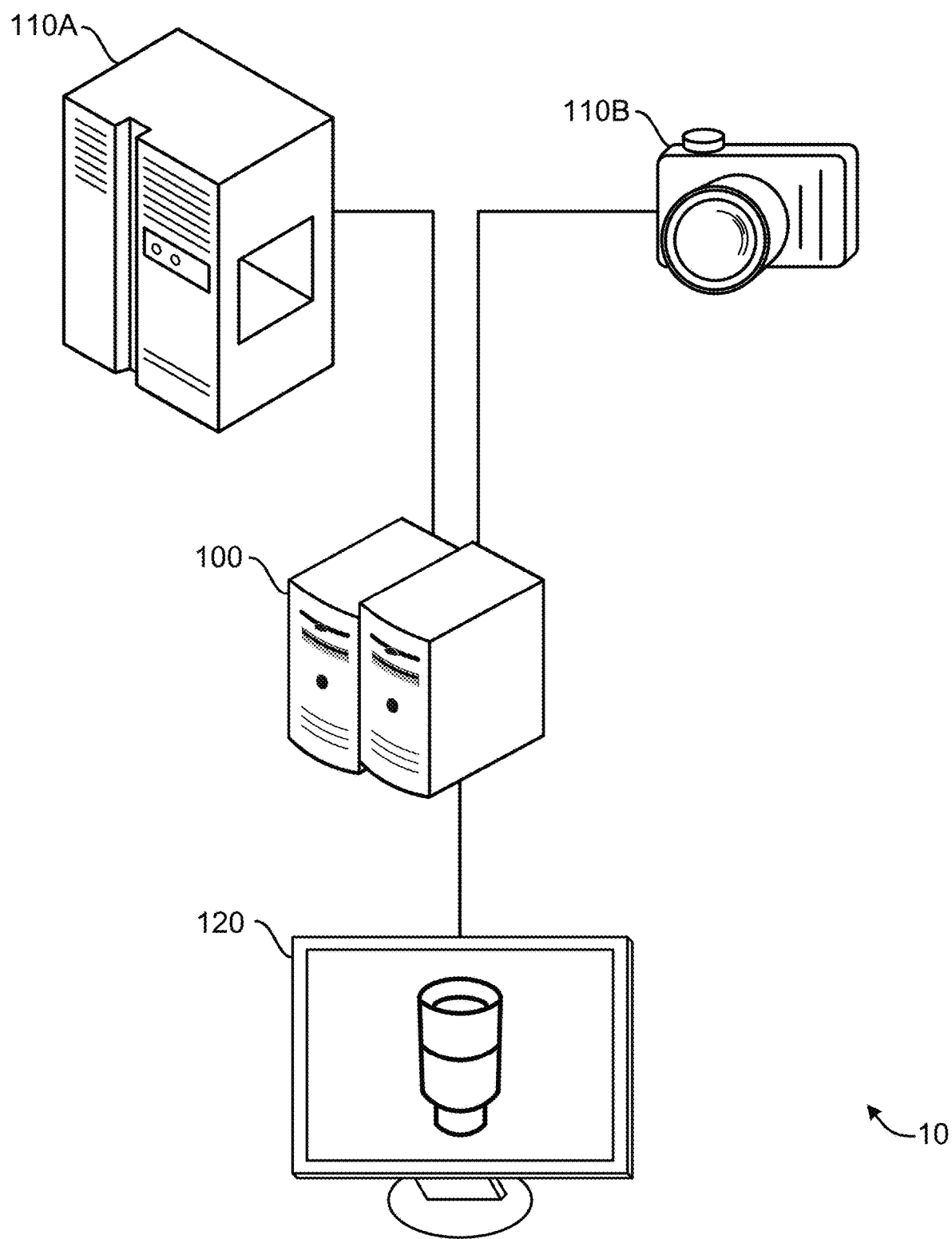
FIG. 1 illustrates an example embodiment of a system for image anomaly detection.

FIG. 1 illustrates an example embodiment of a system 10 for image anomaly detection. The system 10 includes one or more anomaly-detection devices 100; at least one image-capturing device, such as an x-ray or CT machine 110A or a camera 110B; and a display device 120. The one or more anomaly-detection devices 100 are specially configured computing devices that are configured to learn the variations in target regions of object components that have been imaged through the x-ray or CT machine 110A or the camera 110B. The one or more anomaly-detection devices 100 are also configured to process an acquired test image (e.g., from the x-ray or CT machine 110A or the camera 110B) and determine whether measurements in the target regions are anomalous or not. The one or more anomaly-detection devices 100 are also configured to show the image of the component and any anomalous regions on the display device 120.

Figure 2:
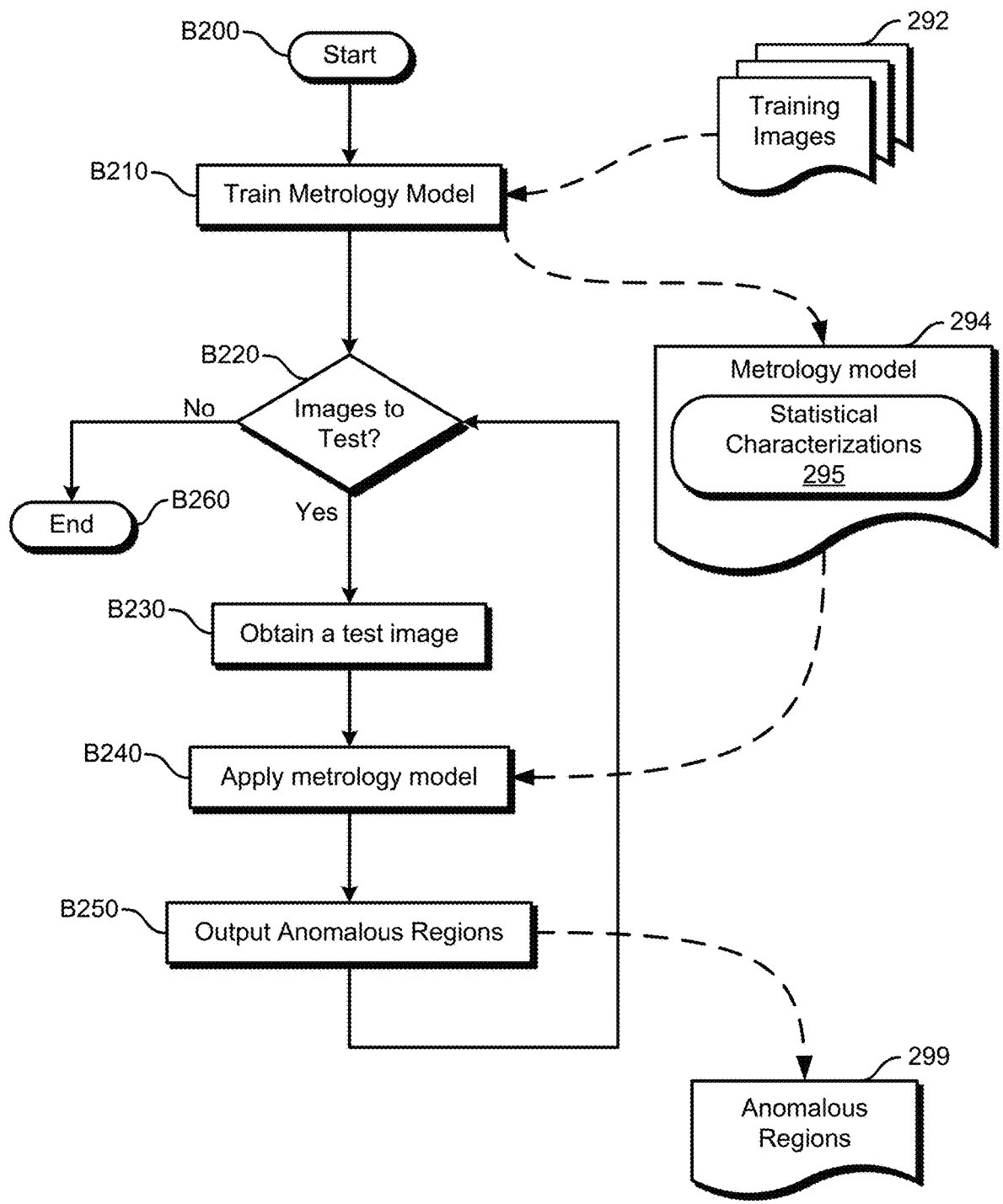
FIG. 2 illustrates an example embodiment of an operational flow for anomaly detection.

FIG. 2 illustrates an example embodiment of an operational flow for anomaly detection. Although this operational flow and the other operational flows that are described herein are each presented in a certain respective order, some embodiments of these operational flows perform at least some of the operations in different orders than the presented orders. Examples of different orders include concurrent, parallel, overlapping, reordered, simultaneous, incremental, and interleaved orders. Also, some embodiments of these operational flows include operations (e.g., blocks) from more than one of the operational flows that are described herein. Thus, some embodiments of the operational flows may omit blocks, add blocks (e.g., include blocks from other operational flows that are described herein), change the order of the blocks, combine blocks, or divide blocks into more blocks relative to the example embodiments of the operational flows that are described herein.

Furthermore, although this operational flow and the other operational flows that are described herein are performed by an anomaly-detection device, some embodiments of these operational flows are performed by two or more anomaly-detection devices or by one or more other specially-configured computing devices.

In FIG. 2, the flow starts in block B200 and continues to block B210, where an anomaly-detection device trains a metrology model 294 using exemplary training images 292. The metrology model 294 contains statistical characterizations 295 of target regions of a component being imaged. Next, the flow moves to block B220, where the anomaly-detection device determines if there are images to be tested. If there are images to be tested (B220=Yes), then the flow proceeds to block B230, where the anomaly-detection device obtains (e.g., retrieves, selects) a test image, and the flow continues to block B240. In block B240, the anomaly-detection device applies the metrology model 294, which includes a statistical characterization 295 of one or more target regions, to the obtained test image. Regions of the test image which do not fit the statistical characterization 295 are then detected and, in block B250, the anomaly-detection device outputs or stores the anomalous regions 299. The flow then returns to block B220, where the anomaly-detection device determines whether there are more images to be tested. If, in block B220, the anomaly-detection device determines that there are no more additional images to be tested (B220=No), then the flow moves to block B260, where the flow ends.

Figure 3:
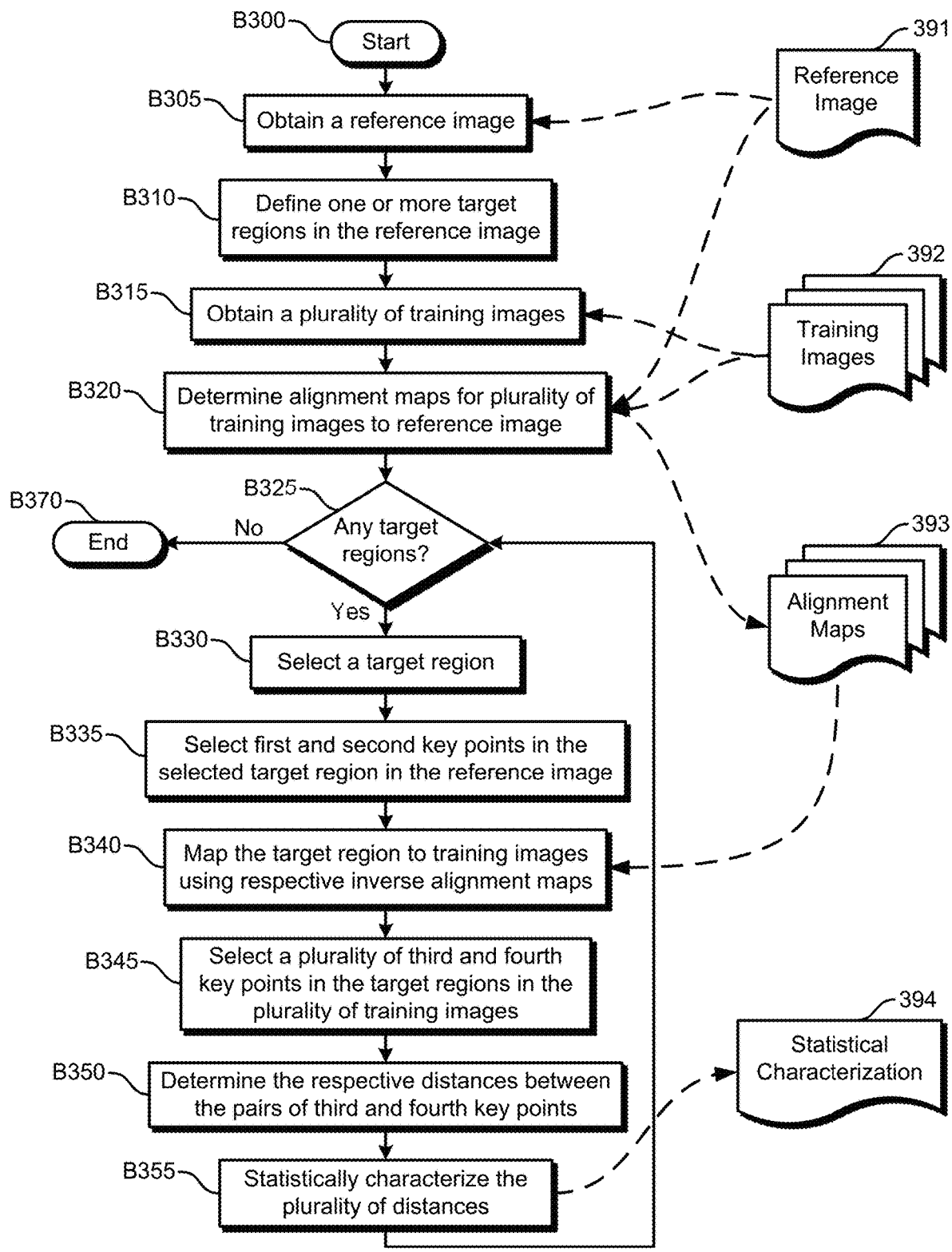
FIG. 3 illustrates an example embodiment of an operational flow for training an anomaly detection model.

FIG. 3 illustrates an example embodiment of an operational flow for training an anomaly detection model. The flow begins in block B300 and continues to block B305, where an anomaly-detection device obtains a reference image 391 (e.g., an image of a component). Next, in block B310, the anomaly-detection device defines one or more target regions in the reference image 391. In some embodiments, the target region is a line that starts at one pixel in the reference image 391 and ends at a different pixel in the reference image 391. The line defines an intensity profile in the image along the line. In some embodiments the line intensity profiles are interpolated along the line to account for transitions across the image pixels in both the x and y directions. The line intensity profile interpolation can be achieved by various techniques, such as nearest neighbor, bi-linear interpolation, or bi-cubic interpolation, for example. In some embodiments, polynomial interpolation is used (e.g., a two-dimensional (for images) or a three-dimensional (for volumes) generalization of a Savitzky-Golay filter), which not only provides image or volume intensity interpolation, but also provides partial derivatives of the intensity along the line. The directional derivatives (e.g., first and second derivatives) of the intensity along the line may then be generated. As will be explained later, the anomaly-detection device may later use the intensity profile along the line and one or more of the intensity derivatives along the line.

In some embodiments, the target region may be defined by a user. For example, the anomaly-detection device may allow the user to mark the reference image 391 with lines (or other target regions) of interest. This may allow the user to define regions or measurements that are of critical importance to the viability of the component being imaged. And, in some embodiments, the anomaly-detection device determines one or more of the target regions, for example regions that correspond to structural walls or channels.

Next, the flow continues to block B315, where a plurality of training images 392 of the component are obtained by the anomaly-detection device. The training images 392—as well as the reference image 391—depict the component in approximately the same orientation and scale. The flow then continues to block B320, where the anomaly-detection device aligns each of the plurality of training images 392 to the reference image 391. The alignment may include some degree of non-linear warping, rotation, and scaling, for example. The output of block B320 is a respective alignment map 393 for each training image 392 that describes transformations that map the coordinates in the training image 392 to the coordinates of the reference image 391.

The flow continues to block B325, where the anomaly-detection device checks if there are any target regions to be processed. If there is at least one target region (B325=Yes), then the flow proceeds to block B330, where the anomaly-detection device selects a target region to be processed. Then, in block B335, the anomaly-detection device selects a pair of key points, which includes a first key point and a second key point, in the target region in the reference image 391. In some embodiments in which a target region is a line, the first and second key points are points along the line that can be easily recognized from one image to the next image. The first and second key points may be selected based on the line's intensity profile, and examples of key points include the following: inflection points along edges, peak intensities, and profile corners at the junction of various intensity regions.

Then the flow continues to block B340, where the anomaly-detection device maps the target region in the reference image 391 to a respective target region in each of the training images 392. The mapping is obtained by using the inverse of the alignment map 393 between the respective training image 392 and the reference image 391. Target regions that correspond to each other depict the same location or approximately the same location on the component. Thus, the target regions in the training images 392 correspond to the target region in the reference image 391. Also, the target regions in the training images 392 may correspond to each other.

Once the target region has been mapped to each of the training images 392, in block B345 the anomaly-detection device selects a pair of key points, which includes a third key point and a fourth key point, in the target region in each training image 392 (each target region in each training image 392 has its own third key point and fourth key point). The third key point and the fourth key point respectively correspond to the first key point and second key point in the reference image. Key points that correspond to each other have the same location or approximately the same location on the component. Accordingly, all of the third key points may correspond to each other, and all of the fourth key points may correspond to each other.

Next, in block B350, with all of the third and fourth key points selected, the anomaly-detection device measures the respective distance between the third and fourth key points in each pair of third and fourth key points. In some embodiments, the reference image 391 is chosen from the plurality of training images 392, and therefore the distance between the first and second key points of the reference image 391 is also included in the distances measured. Also, in some embodiments, the anomaly-detection device calculates a respective global scale factor or a respective local scale factor between each of the training images 392 and the reference image 391 and applies a correction to the respective distance in each of the training images 392 based on the respective global scale factor or the respective local scale factor.

In block B355, the anomaly-detection device statistically characterizes the plurality of distances for the target region, thereby generating a statistical characterization 394 of the target region. Some embodiments of the anomaly-detection device calculate a mean and a standard deviation of the distances as the statistical characterization 394. For example, some embodiments generate the statistical characterization 394 robustly using one or more of the following: a median value, a MAD (Median Absolute Deviations), or an IQR (Inter-Quartile Range), for example. And some embodiments perform density estimation, use the distance histograms as the statistical characterization 394, or fit the observed data to a reference probability distribution or density.

The flow then returns to block B325, where a determination is made as to whether there is another target region. If there is another target region, then the anomaly-detection device repeats blocks B330-B355. Otherwise (B325=No), the flow moves to block B370, where the flow ends.

Figure 4:
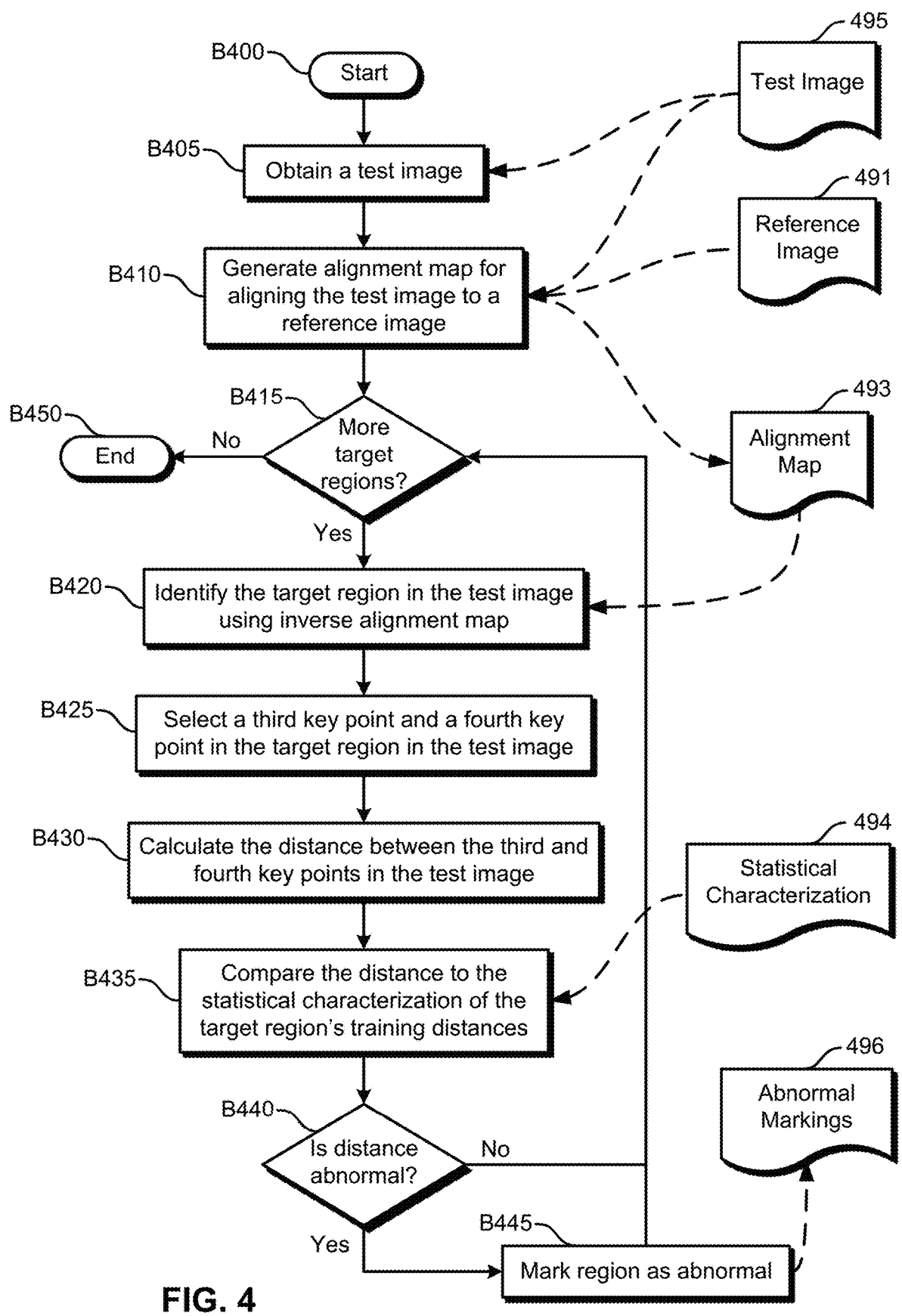
FIG. 4 illustrates an example embodiment of an operational flow for testing an image for anomalies.

FIG. 4 illustrates an example embodiment of an operational flow for testing an image for anomalies. This embodiment applies a metrology model, for example the metrology model 294 in FIG. 2. The flow begins in block B400 and moves to block B405, where an anomaly-detection device obtains a test image 495 (for example from an image-capturing device 110A or 110B in FIG. 1). In block B410, the anomaly-detection device generates an alignment map 493 that the anomaly-detection device can use to align the test image 495 to a reference image 491.

In block B415, the anomaly-detection device determines whether there are any target regions to process. If so (B415=Yes), the flow proceeds to block B420, where the anomaly-detection device identifies the target region (e.g., a measurement line) in the test image 495 using the inverse of the alignment map 493. For example, the anomaly-detection device may project a target region from the reference image 491 to the test image 495 using the inverse of the alignment map 493. Then, in block B425, the anomaly-detection device selects a pair of key points, which includes a third key point and a fourth key point, in the target region in the test image 495 based on the first and second key points that were defined in the reference image 491. The third key point in the test image 495 corresponds to the first key point in the reference image 491, and the fourth key point in the test image 495 corresponds to the second key point in the reference image 491.

In block B430, the anomaly-detection device calculates the distance between the third and fourth key points in the test image 495. Some embodiments of the anomaly-detection device adjust the distance between the third and fourth key points in the test image 495 based on global scaling or local scaling. Next, in block B435, the anomaly-detection device compares the distance to the statistical characterization 494 of the target region's corresponding training distances (the distances between the third and fourth key points in the training images).

The flow then continues to block B440, where the anomaly-detection device determines whether the distance in the test image is abnormal based on the comparison to the statistical characterization 494 in block B435. For example, some embodiments determine that a distance is abnormal if the distance is more than n standard deviations from the mean or median (e.g., n=4). In some embodiments, the determination is based on a calculated probability of observing such a distance, a calculated probability of observing a greater distance (e.g., if the distance is greater than the expected mean or median), or a calculated probability of observing a lesser distance (e.g., if the distance is less than the expected mean or median) given the observed distances in the training and reference images.

If the region is determined to be abnormal in block B440 (B440=Yes), then the flow moves to block B445, where the anomaly-detection device marks the region with an abnormal marking 496. The flow then returns to block B415. If the region is determined to not be abnormal (B440=No), then the flow returns to B415, and the anomaly-detection device does not mark the region as abnormal.

Again, in block B415, the anomaly-detection device determines whether there are any more target regions to be processed (e.g., target regions that have not yet been processed). If another target region is to be processed (B415=Yes), then the flow repeats blocks B420 through B445. If no more target regions are to be processed (B415=No), then the flow ends at block B450.

In some embodiments, training and test images are aligned and mapped directly back to the original reference-image coordinates. In these embodiments, distances are implicitly scaled to the reference space, and the target regions are defined on the aligned images all in the reference-image coordinates. This may simplify some of the processing but may also present problems if the alignment includes warping, which may distort some distances. Thus some embodiments use linear or affine alignment methods to prevent unanticipated contraction or dilation of distance measurements. However, these embodiments may optionally use non-linear alignment methods (local warping) to help determine correspondences between the first and third key points and the second and fourth key points.

Figure 5A:
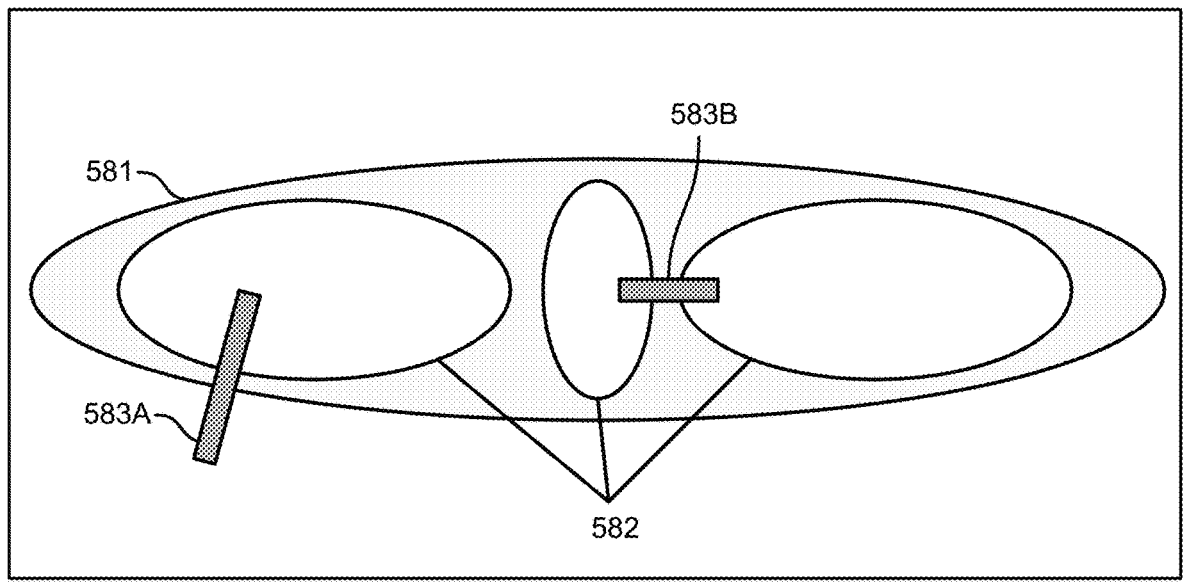
FIG. 5A illustrates an example embodiment of an image of a component with target regions.

FIG. 5A illustrates an example embodiment of an image of a component 581 with target regions (a first target region 583A and a second target region 583B). The image shows a cross-section of the component 581, which include three openings or channels 582. Some embodiments of an anomaly-detection device generate a user interface that provides a user the ability to indicate the first target region 583A and the second target region 583B by drawing respective lines across regions of interest that are to be measured. In this example embodiment, the wall thickness of the component 581 may be of critical design importance to the structural integrity or function of the component 581. A user may identify such regions in the component 581 by drawing a respective line across each region.

Figure 5B:
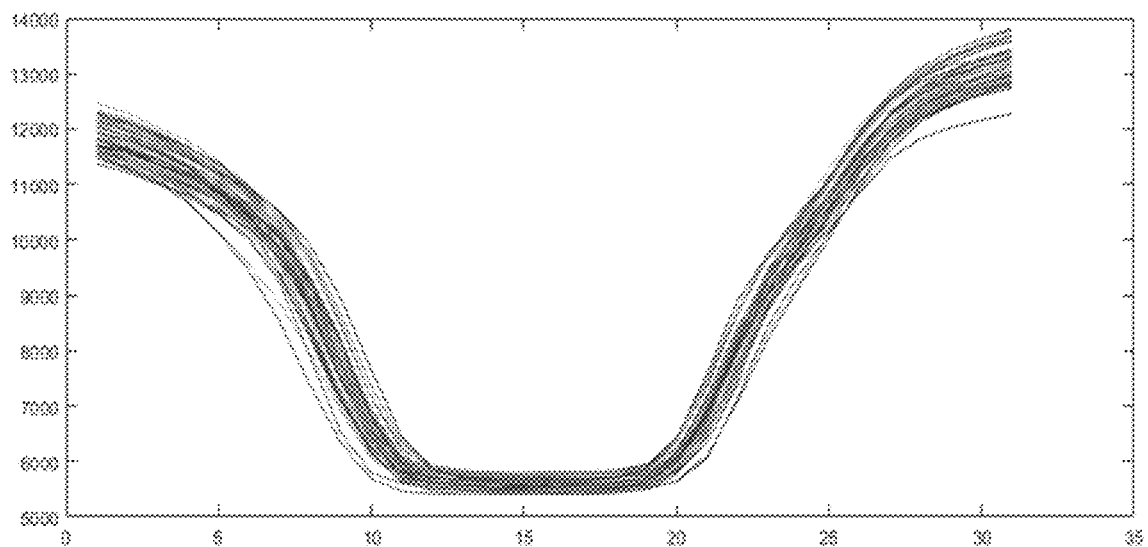
FIG. 5B illustrates example embodiments of line intensity profiles.

FIG. 5B illustrates example embodiments of line intensity profiles. In FIG. 5B, the y axis indicates intensity, and the x axis indicates position. The first target region 583A was identified in a plurality of training images, and each line intensity profile shows the intensity of the first target region 583A in a respective training image of the plurality of training images. FIG. 5B shows significant variations in the intensity profiles in the first target region 583A.

Figure 6A:
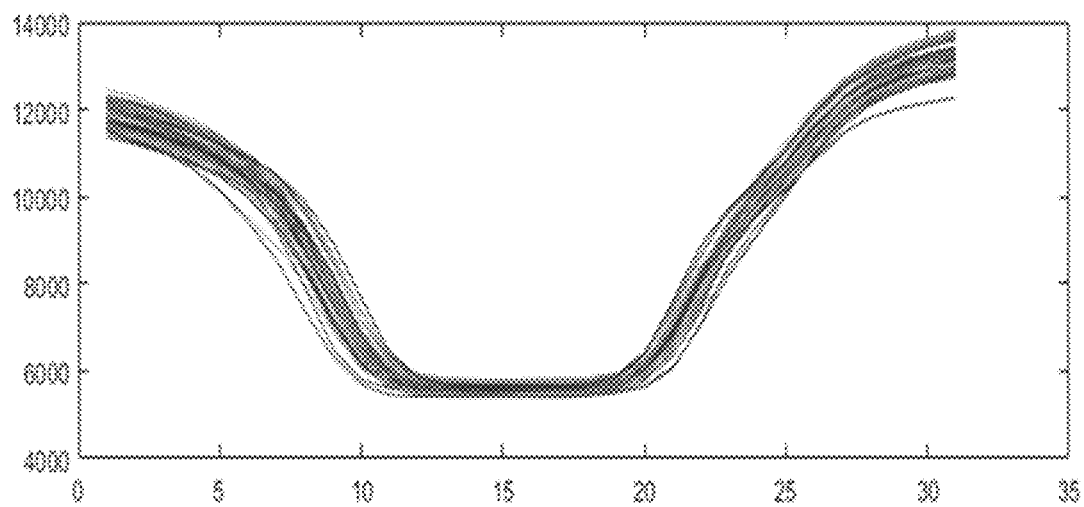
FIG. 6A illustrates example embodiments of line intensity profiles.
Figure 6B:
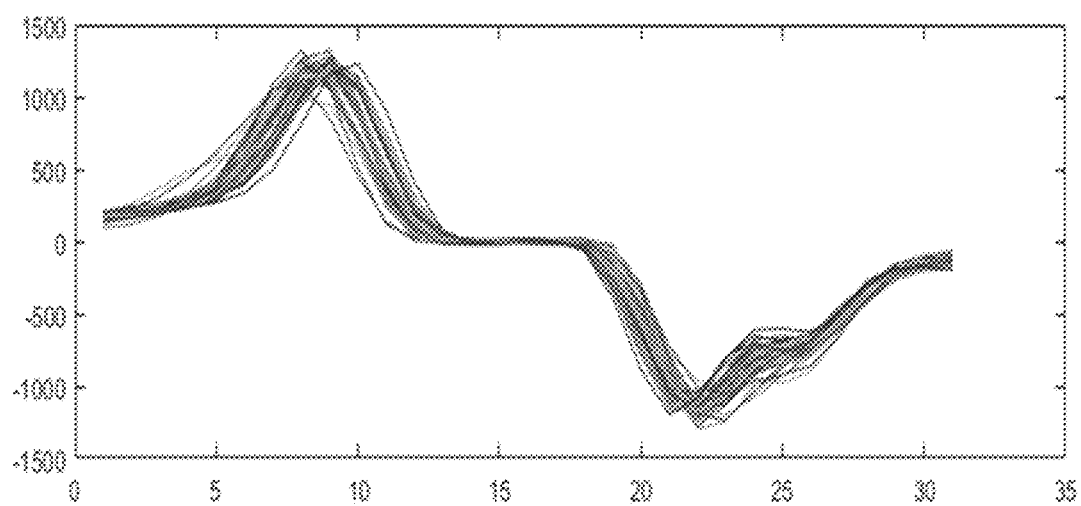
FIG. 6B illustrates the first derivatives of the line intensity profiles in FIG. 6A.
Figure 6C:
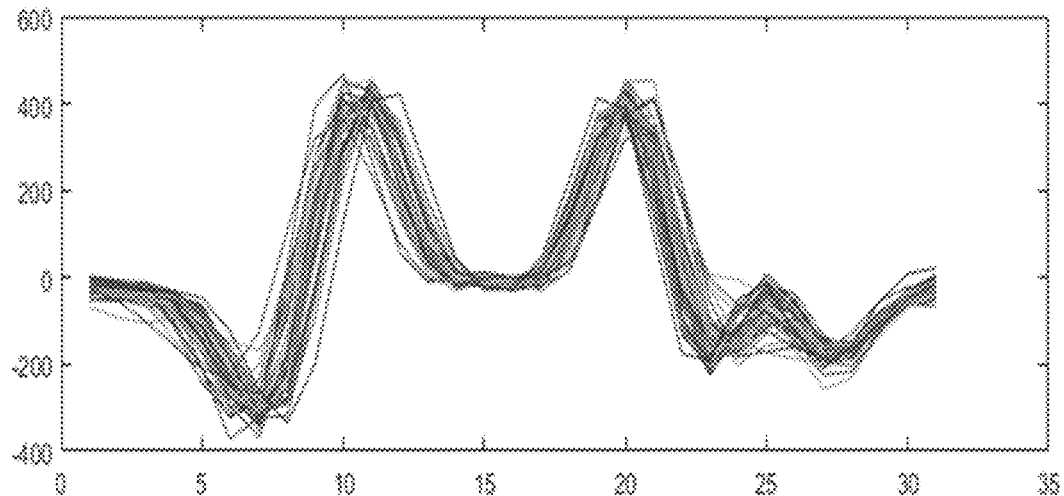
FIG. 6C illustrates the second derivatives of the line intensity profiles in FIG. 6A.

FIG. 6A illustrates example embodiments of line intensity profiles, FIG. 6B illustrates the first derivatives of the line intensity profiles in FIG. 6A, and FIG. 6C illustrates the second derivatives of the line intensity profiles in FIG. 6A.

FIG. 6A illustrates the line intensity profiles from the first target region 583A in FIG. 5A. In FIG. 6A, the y axis indicates intensity, and the x axis indicates position. Also, the line intensity profiles in FIG. 6A, the first derivatives in FIG. 6B, and the second derivatives in FIG. 6C have been smoothed. In this example, the smoothed profiles and their respective derivatives were calculated by fitting each sample in the profile to a polynomial using the three neighboring samples to the left and to the right of the sample in question. This approach is sometimes referred to as a Savitzky-Golay filter. Because each point is fit to a local polynomial, derivatives of the polynomial fit can be easily calculated, provided that the polynomial order is high enough to support non-zero higher-order derivatives. Additionally, in this example embodiment, the line profiles were linearly extrapolated by three samples on the left side and by three samples of the right side of the profiles to calculate the smoothed profiles and their derivatives at the beginnings and the ends of the profiles. Also, the smoothed profiles and their derivatives may be truncated at the beginning and end or estimated causally or non-causally. To calculate first and second order derivatives, the polynomial should be at least cubic. Also, other smoothing filters, such as Gaussian filters, sliding median filters, or mean filters, can be used to smooth the line intensity profiles.

FIGS. 6B and 6C show that the intensity profile derivatives are highly repeatable across the training images. Thus, key points can be selected based on the line intensity profiles, based on the first derivatives of the line intensity profiles, and based on the second derivatives of the line intensity profiles. For example, key points (e.g., as selected in B335 or B345 in FIG. 3, as selected in B425 in FIG. 4) may be local minima or maxima of the line intensity profiles, local minimums or maximums of the first derivatives of the line intensity profiles, local minima or maxima of the second derivatives of the line intensity profiles, zero crossings of the first derivatives of the line intensity profiles, or zero crossings of the second derivatives of the line intensity profiles.

Other embodiments of the anomaly-detection device use other techniques to select key points, and above-describe embodiments present a few example embodiments. For example, approximations of first derivative filters, such as Prewitt and Sobel filters, or approximations of second derivative filters, such as Laplacian filters, can also be used to locate the key points after being convolved with the smoothed line intensity profiles. Also for example, the target region in an image may be filtered with Sobel kernels in the horizontal and vertical directions, and then the resulting filter magnitudes may be projected onto the target region to select key points along the target region.

Other embodiments provide for key points to be selectable by a user based on the stability and repeatability of the key points across the set of training images. And some embodiments of the anomaly-detection device provide suggestions of key point pairs to a user. For example, candidate key points may be determined based on the derivatives as described above. Then candidate key-point pairs can be ranked based on the variance or MAD of distances between the key points in the pairs so that the key points suggested to the user represent the key points that provide more consistency in measurement across the training images. In some cases, the variation (e.g., variance or MAD) can be relative to the overall mean or median distance so that the suggestions are not biased towards suggesting key points that measure smaller distances or larger distances. For example, some embodiments of an anomaly-detection device display ranked key-point pairs on a user interface, highlight suggested key-point pairs on the user interface, and receive one or more user selections of key-point pairs via the user interface.

Figure 7A:
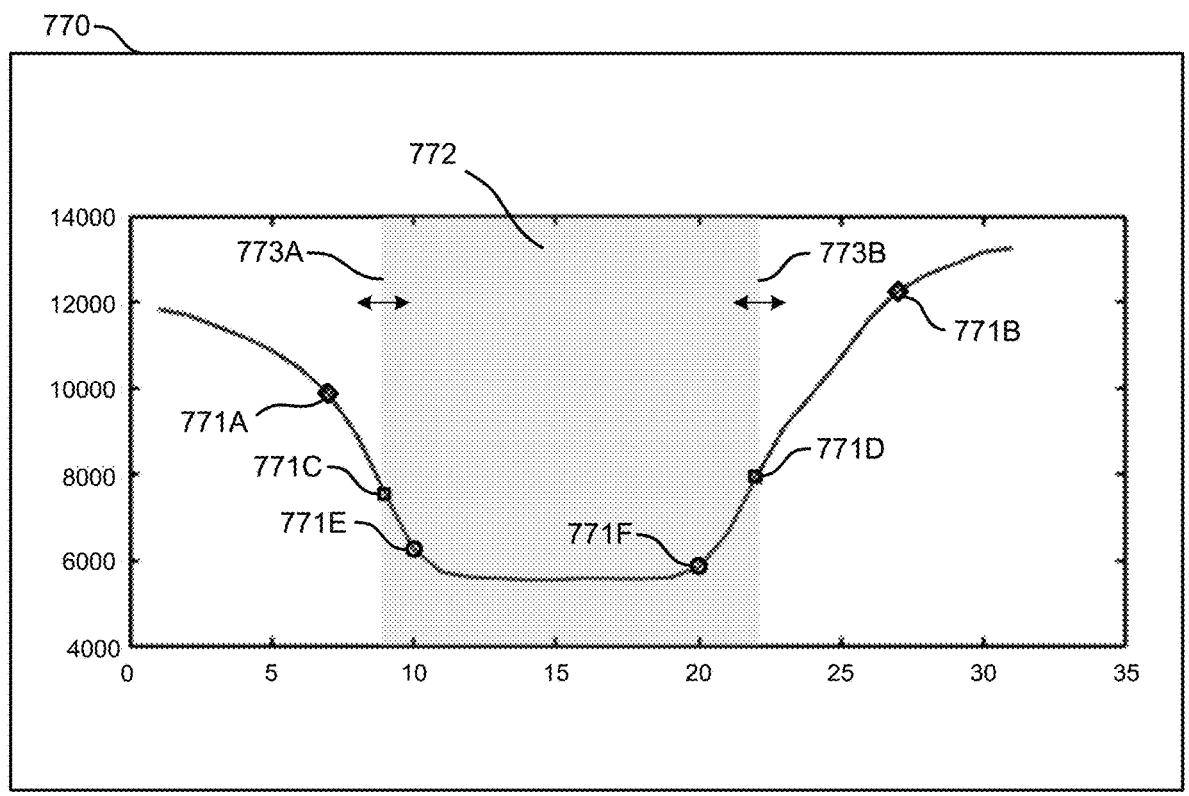
FIG. 7A illustrates an example embodiment of a user interface that displays key points along a line intensity profile.

FIG. 7A illustrates an example embodiment of a user interface that displays key points along a line intensity profile. The user interface 770 shows the line intensity profile of a reference image from FIG. 6A. The user interface 770 also shows various candidate key points 771A-F. Candidate key points 771A and 771B, which are marked with diamonds, were obtained from local minima of the line intensity profile's second derivative. Candidate key points 771C and 771D, which are marked with squares, were obtained from the extrema of the first derivative (e.g., the maximum value and the minimum value along the intensity profile's first derivative). Candidate key points 771E and 771F, which are marked with circles, were obtained from the local maxima of the second derivative of the intensity profile.

The highlighted region 772 is a user-interface element that may be adjusted by moving the edges 773A-773B of the highlighted region. Some embodiments of the anomaly-detection device allow the highlighted region 772 to snap to two of the candidate key points 771A-F. In this way, the user may define the critical measurement to make along the target region's intensity profile by defining the key points. Using key points that are consistent across images improves the automation and detection of measurements in test and training images.

In some embodiments, key-point correspondence between third and fourth key points (e.g., as selected in B345 in FIG. 3, as selected in B425 in FIG. 4) and first and second key points (e.g., as selected in B335 in FIG. 3) along the line intensity profile is performed for a plurality of key points along the line intensity profile. In this way, not only are the selected measurement key points used for measurement correspondence, but also the additional non-measurement key points may be used to more accurately register the intensity profiles between images. A median shift between key points along the profile may be used and can even help determine a test-image key-point location.

Also, some embodiments measure the distance between key points in pixels. And some embodiments measure the distance in some other unit of measurement using a conversion scale that converts the scale in the image to the other unit of measurement (e.g., that converts pixels to another unit of distance, such as a nanometer or a millimeter).

Additionally, some embodiments statistically characterize variations of a plurality of key points to help the anomaly-detection device determine whether statistically significant component variation (e.g., distortion) has occurred along the intensity profile of the target region.

And some embodiments statistically characterize the target region through a correlation or normalized correlation of the target region or line intensity profile. The intensity of the target region or the line intensity profile is first normalized with the intensity of the reference target region or line intensity profile or is normalized based on the statistics of a bigger region that contains the defined target region or line intensity profile. Thus, variations in the target region or line intensity profile can be measured wholly along the line intensity profile, instead of only a measurement of variation in distances. These embodiments may help further detect abnormalities in the target region. Some embodiments perform stretching of intensity profiles to make the profiles the same length when performing correlations. Other embodiments do not perform stretching and pad shorter profiles, for example with an average value or zero. And some embodiments find key points on the line intensity profile by finding points on the intensity profile that have a maximal orthogonal distance from a line connecting the profile extrema points.

Figure 7B:
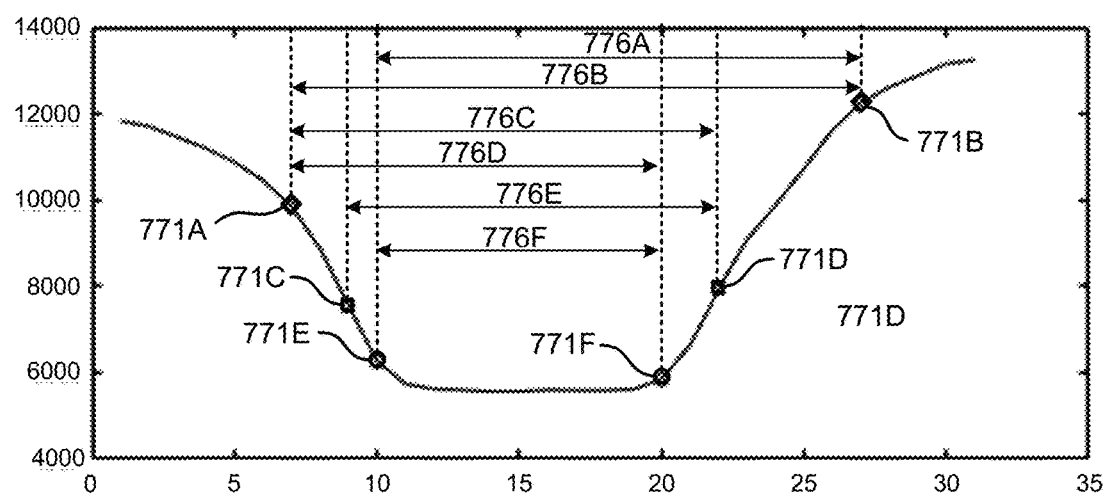
FIG. 7B illustrates example embodiments of distances between pairs of key points.

FIG. 7B illustrates example embodiments of distances 776A-F between pairs of key points 771A-F. The key points 771A-F in FIG. 7B are the same as the candidate key points 771A-F in FIG. 7A. The distance between a pair of key points depends on the key points 771A-F that are selected. For example, the distance will be distance 776A if key point 771E and key point 771B are selected. The distance will be distance 776C if key point 771A and key point 771D are selected. The distance will be distance 776F if key point 771E and key point 771F are selected.

Figure 8:
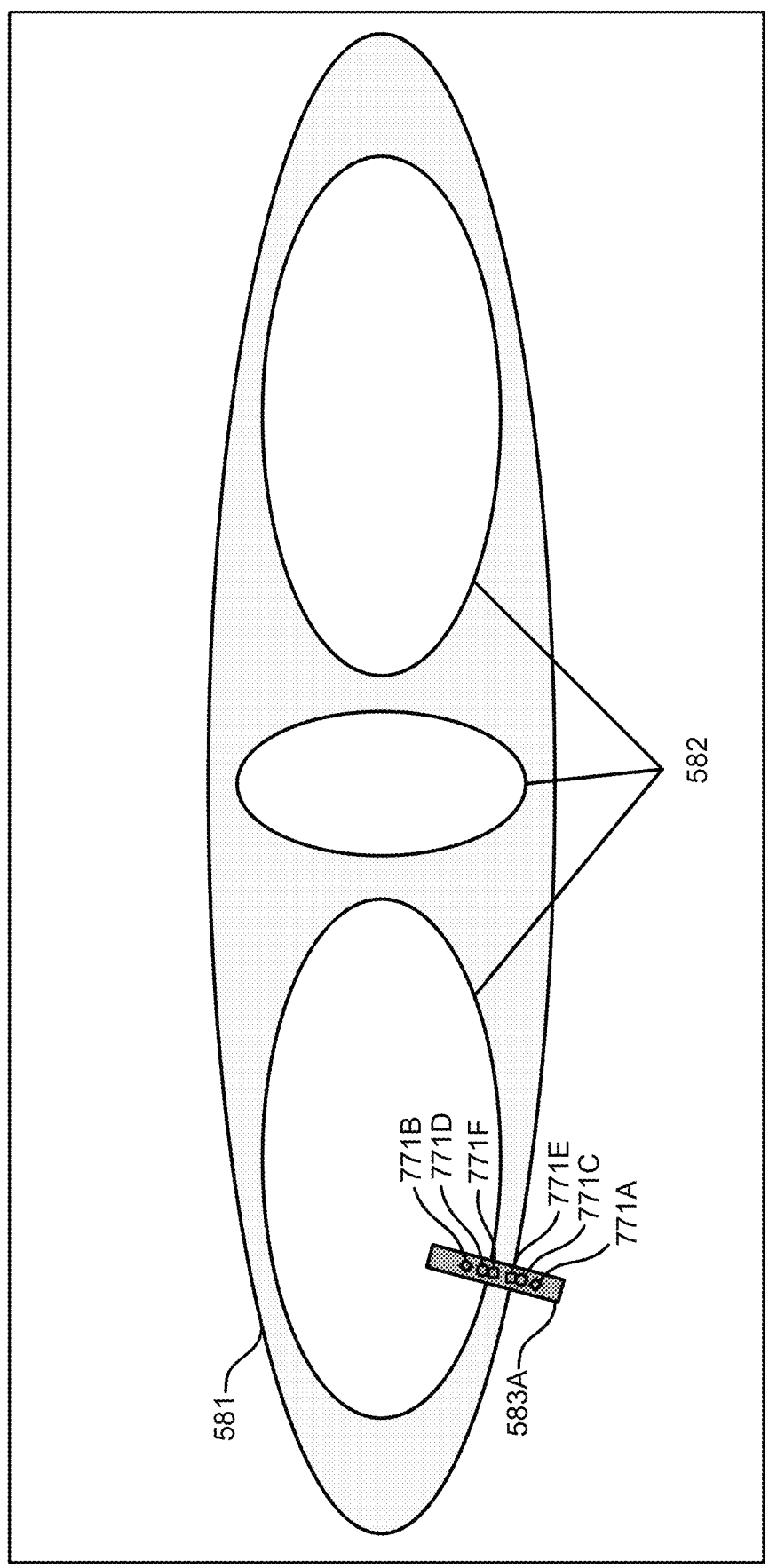
FIG. 8 illustrates an example embodiment of an image of a component, a target region, and key points.

FIG. 8 illustrates an example embodiment of an image of a component, a target region, and key points. The component 581 and the first target region 583A are the same as in FIG. 5A. Also, FIG. 8 shows the candidate key points 771A-F from FIG. 7A in the first target region 583A. A pair of key points from the candidate key points 771A-F can be used to measure the thickness of the component 581 in the first target region 583A.

Figure 9:
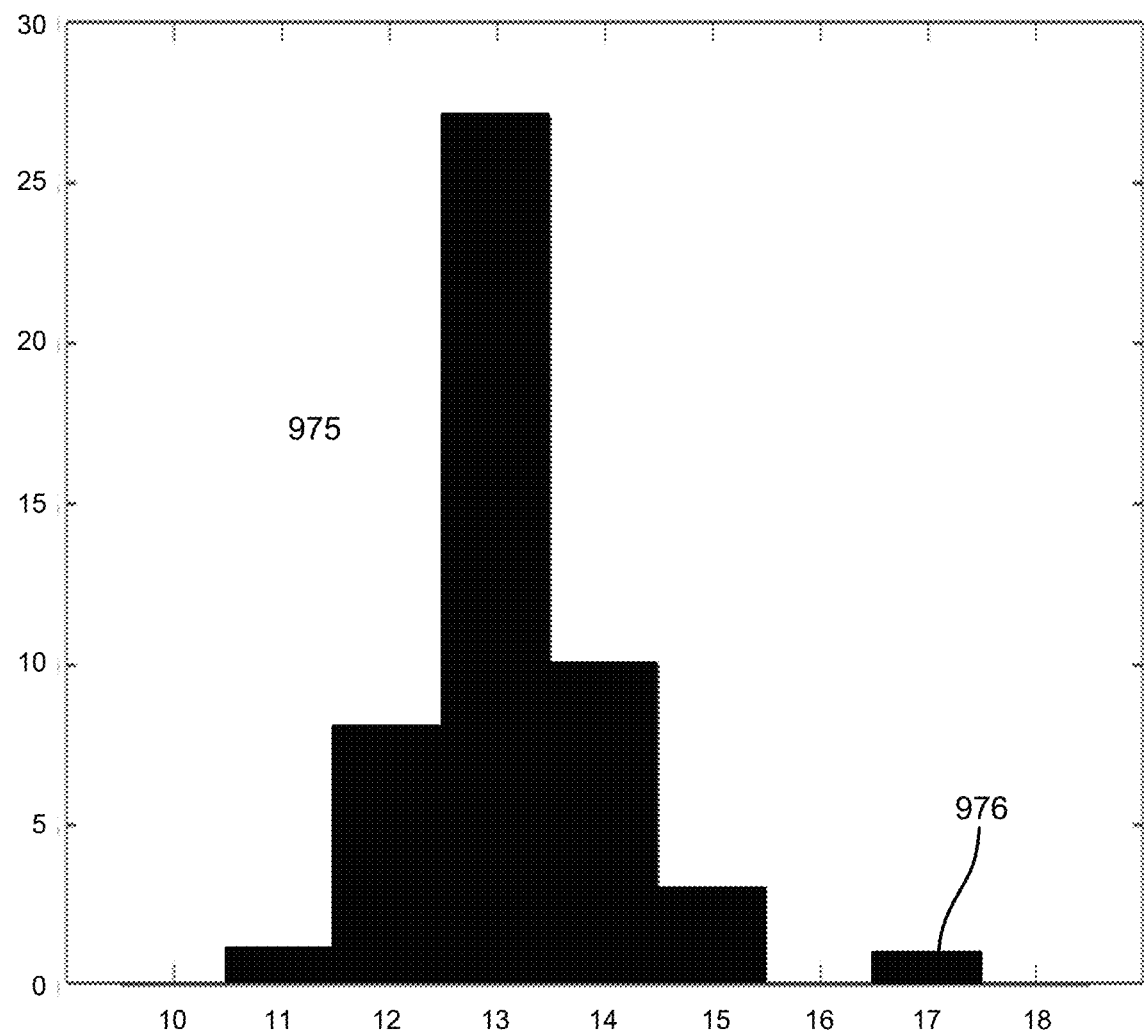
FIG. 9 illustrates an example embodiment of a statistical characterization of the distances between key points on line intensity profiles from training images.

FIG. 9 illustrates an example embodiment of a statistical characterization of the distances between key points on line intensity profiles from training images. FIG. 9 includes a histogram 975 of third-to-fourth key-point distances, and the histogram 975 can be used to characterize the distances. For example, a mean and a standard deviation may be calculated, and a corresponding test-image measurement (e.g., test-image measurement 976) may be compared against the mean and the standard deviation to determine if the test-image measurement 976 is an abnormal (e.g., outlying) measurement. Some embodiments use the histogram 975 to estimate the probability density of the measurements, which may reflect naturally occurring manufacturing variances of the region of the component under scrutiny. Also, some embodiments use a classifier that learns abnormal and non-abnormal measurements. Additionally, although the x axis in FIG. 9 indicates the distance in pixels, some embodiments use other measures of distance (e.g., millimeters, centimeters, inches).

Furthermore, some embodiments may not use a statistical characterization of the distance between key points. In such embodiments, the key points are used to compare a region of a test image to a respective region of a reference image, and anomalies are generated when the measurement deviates from an expected measurement (within a specified tolerance) or deviates from the measurement (within the specified tolerance) obtained in the reference image. In these embodiments, only one training image (the reference image) is needed instead of a plurality of training images. However, some embodiments may still use the plurality of training images to determine the expected measurement, to identify stable or repeatable key points, or to provide the user with feedback as to the distribution of the measurements found in the training images relative to the manufacturing tolerance. In this manner, the user can then see how close the manufacturing variation is to the specified tolerance.

Figure 10:
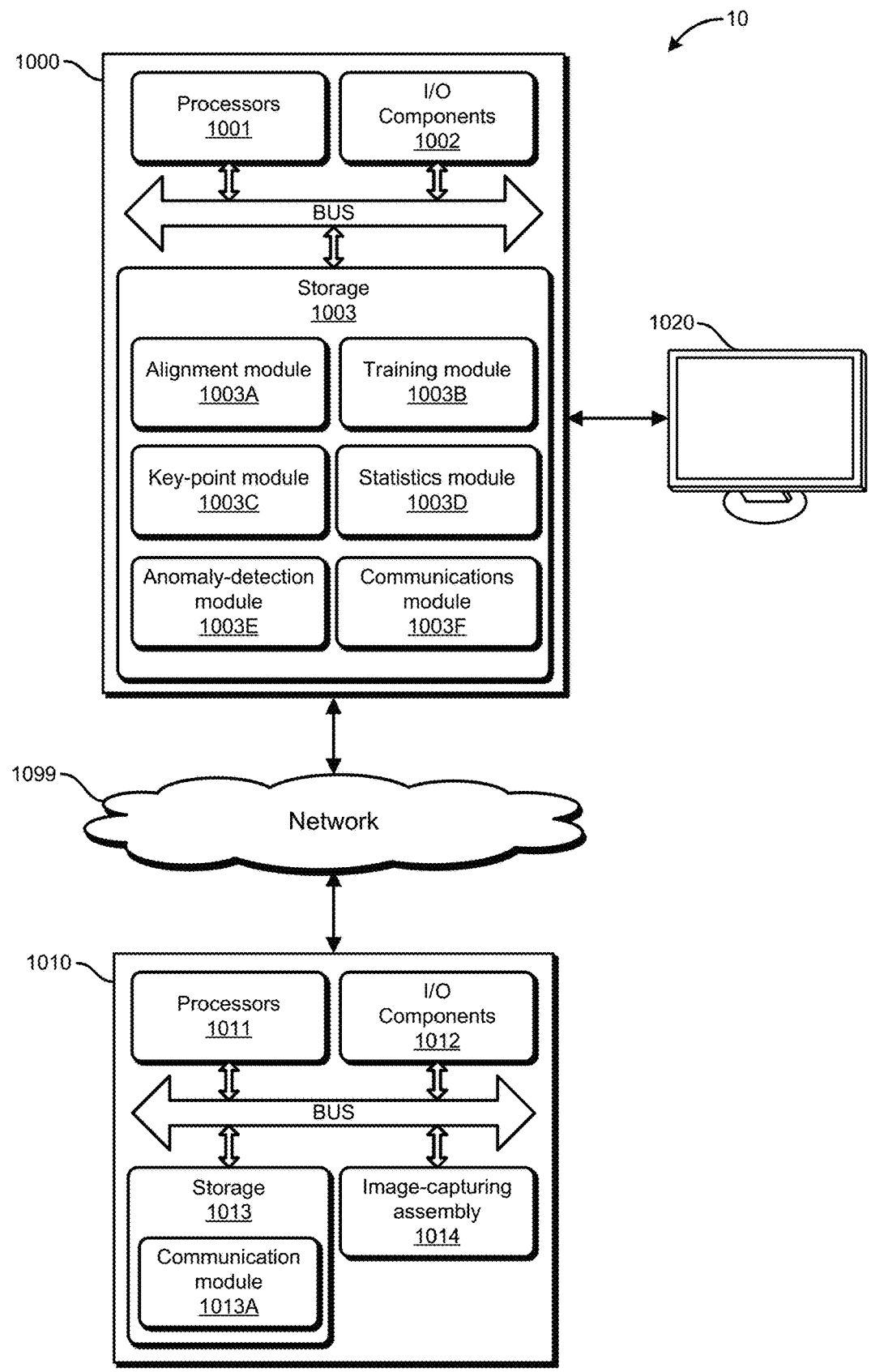
FIG. 10 illustrates an example embodiment of a system for image anomaly detection.

FIG. 10 illustrates an example embodiment of a system for image anomaly detection. The system 10 includes an anomaly-detection device 1000, which is a specially-configured computing device; an image-capturing device 1010; and a display device 1020. In this embodiment, the anomaly-detection device 1000 and the image-capturing device 1010 communicate via one or more networks 1099, which may include a wired network, a wireless network, a LAN, a WAN, a MAN, and a PAN. Also, in some embodiments the devices communicate via other wired or wireless channels.

The anomaly-detection device 1000 includes one or more processors 1001, one or more I/O components 1002, and storage 1003. Also, the hardware components of the anomaly-detection device 1000 communicate via one or more buses or other electrical connections. Examples of buses include a universal serial bus (USB), an IEEE 1394 bus, a PCI bus, an Accelerated Graphics Port (AGP) bus, a Serial AT Attachment (SATA) bus, and a Small Computer System Interface (SCSI) bus.

The one or more processors 1001 include one or more central processing units (CPUs), which may include one or more microprocessors (e.g., a single core microprocessor, a multi-core microprocessor); one or more graphics processing units (GPUs); one or more tensor processing units (TPUs); one or more application-specific integrated circuits (ASICs); one or more field-programmable-gate arrays (FPGAs); one or more digital signal processors (DSPs); or other electronic circuitry (e.g., other integrated circuits). The I/O components 1002 include communication components (e.g., a graphics card, a network-interface controller) that communicate with the display device 1020, the network 1099, the image-capturing device 1010, and other input or output devices (not illustrated), which may include a keyboard, a mouse, a printing device, a touch screen, a light pen, an optical-storage device, a scanner, a microphone, a drive, and a game controller (e.g., a joystick, a gamepad).

The storage 1003 includes one or more computer-readable storage media. As used herein, a computer-readable storage medium includes an article of manufacture, for example a magnetic disk (e.g., a floppy disk, a hard disk), an optical disc (e.g., a CD, a DVD, a Blu-ray), a magneto-optical disk, magnetic tape, and semiconductor memory (e.g., a non-volatile memory card, flash memory, a solid-state drive, SRAM, DRAM, EPROM, EEPROM). The storage 1003, which may include both ROM and RAM, can store computer-readable data or computer-executable instructions.

The anomaly-detection device 1000 also includes an alignment module 1003A, a training module 1003B, a key-point module 1003C, a statistics module 1003D, an anomaly-detection module 1003E, and a communication module 1003F. A module includes logic, computer-readable data, or computer-executable instructions. In the embodiment shown in FIG. 10, the modules are implemented in software (e.g., Assembly, C, C++, C#, Java, BASIC, Perl, Visual Basic, Python). However, in some embodiments, the modules are implemented in hardware (e.g., customized circuitry) or, alternatively, a combination of software and hardware. When the modules are implemented, at least in part, in software, then the software can be stored in the storage 1003. Also, in some embodiments, the anomaly-detection device 1000 includes additional or fewer modules, the modules are combined into fewer modules, or the modules are divided into more modules.

The alignment module 1003A includes instructions that cause the anomaly-detection device 1000 to align training images or test images (e.g., align training images or test images to a reference image) and produce corresponding alignment maps. For example, some embodiments of the alignment module 1003A include instructions that cause the anomaly-detection device 1000 to perform at least some of the operations that are described in block B320 in FIG. 3 or in block B410 of FIG. 4.

The training module 1003B includes instructions that cause the anomaly-detection device 1000 to train a metrology model using a reference image and a plurality of training images. For example, some embodiments of the training module 1003B include instructions that cause the anomaly-detection device 1000 to perform at least some of the operations that are described in block B210 in FIG. 2 or in blocks B300-B355 in FIG. 3. Also, the training module 1003B may call the alignment module 1003A, the key-point module 1003C, or the statistics module 1003D.

The key-point module 1003C includes instructions that cause the anomaly-detection device 1000 to select key points in a target region (e.g., based on the target region's intensity profile). For example, some embodiments of the key-point module 1003C include instructions that cause the anomaly-detection device 1000 to perform at least some of the operations that are described in blocks B335 and B345 in FIG. 3 or in block B425 in FIG. 4.

The statistics module 1003D includes instructions that cause the anomaly-detection device 1000 to generate a statistical characterization of one or more target regions. For example, some embodiments of the statistics module 1003D include instructions that cause the anomaly-detection device 1000 to perform at least some of the operations that are described in block B355 in FIG. 3 to produce a statistical characterization 394 of a target region.

The anomaly-detection module 1003E includes instructions that cause the anomaly-detection device 1000 to detect one or more anomalies in target regions based on statistical characterizations of the regions. For example, some embodiments of the anomaly-detection module 1003E include instructions that cause the anomaly-detection device 1000 to perform the operations that are described in blocks B220-B260 in FIG. 2 or in blocks B415-B445 in FIG. 4. Results from the anomaly-detection module 1003E may be shown on the display device 1020 by highlighting potential anomalies in a test image to a user of the device. Also, anomaly-detection module 1003E may call the key-point module 1003C.

The communications module 1003F includes instructions that cause the anomaly-detection device 1000 to communicate with one or more other devices (e.g., the image-capturing device 1010, the display device 1020), for example to obtain one or more images from the other devices or to send one or more images to the other devices.

The image-capturing device 1010 includes one or more processors 1011, one or more I/O components 1012, storage 1013, a communication module 1013A, and an image-capturing assembly 1014. The image-capturing assembly 1014 includes one or more image sensors and may include one or more lenses and an aperture. The communication module 1013A includes instructions that, when executed, or circuits that, when activated, cause the image-capturing device 1010 to capture an image, receive a request for an image from a requesting device, retrieve a requested image from the storage 1013, or send a retrieved image to the requesting device (e.g., the detection device 1000).

At least some of the above-described devices, systems, and methods can be implemented, at least in part, by providing one or more computer-readable media that contain computer-executable instructions for realizing the above-described operations to one or more computing devices that are configured to read and execute the computer-executable instructions. The systems or devices perform the operations of the above-described embodiments when executing the computer-executable instructions. Also, an operating system on the one or more systems or devices may implement at least some of the operations of the above-described embodiments.

Furthermore, some embodiments use one or more functional units to implement the above-described devices, systems, and methods. The functional units may be implemented in only hardware (e.g., customized circuitry) or in a combination of software and hardware (e.g., a microprocessor that executes software).

Additionally, some embodiments of the devices, systems, and methods combine features from two or more of the embodiments that are described herein. Also, as used herein, the conjunction "or" generally refers to an inclusive "or," though "or" may refer to an exclusive "or" if expressly indicated or if the context indicates that the "or" must be an exclusive "or."

The invention claimed is:

1. A device comprising:
   one or more computer-readable storage media; and
   one or more processors that are configured to cause the device to perform operations including:
   obtaining a plurality of training images;
   selecting one or more target regions in the plurality of training images, wherein each target region of the one or more target regions includes a respective intensity profile of a respective line in a respective image of the plurality of training images;
   generating one or more respective statistical characterizations of the one or more target regions based, at least in part, on the respective intensity profiles of the one or more target regions;
   obtaining a test image;
   locating the one or more target regions in the test image;
   comparing the one or more target regions in the test image to the one or more respective statistical characterizations of the one or more target regions; and detecting anomalies in the one or more target regions in the test image based, at least in part, on the comparison of the one or more target regions in the test image to the one or more respective statistical characterizations of the one or more target regions.

2. The device of claim 1, wherein the operations further include defining a respective pair of key points on the respective intensity profile of each target region in the plurality of training images; and wherein the statistical characterizations include statistics on distances in the plurality of training images measured between the key points in the respective pairs of key points in the target regions in the plurality of training images.

3. The device of claim 2, wherein the plurality of training images includes a reference image, and wherein the respective pair of key points in the reference image corresponds to the respective pairs of key points in other images of the plurality of training images.

4. The device of claim 3, wherein a correspondence between the pair of key points in the reference image and the respective pairs of key points in the other images of the plurality of training images is obtained based, at least in part, on an alignment mapping between the reference image and the other images of the plurality of training images.

5. The device of claim 2, wherein the respective key points are selected based, at least in part, on the respective intensity profile of the line in the respective image.

6. The device of claim 5, wherein the respective key points are selected based, at least in part, on respective derivatives of the respective intensity profile of the line in the respective image.

7. The device of claim 1, wherein each of the respective lines is composed of a respective plurality of pixels that are spatially arranged in a respective order and each pixel of the respective plurality of pixels has a respective intensity, and wherein each of the intensity profiles indicates the intensities of the pixels of the respective plurality of pixels of the respective line, of the intensity profile, in the respective order of the respective line.

8. The device of claim 1, wherein each of the respective lines includes a respective plurality of pixels, each having a respective intensity, that are spatially arranged in a respective order, and each pixel of the plurality of pixels has a position in the order, and wherein each of the intensity profiles includes the intensities of the pixels of the respective plurality of pixels of the respective line of the intensity profile, and, in the intensity profile, the respective intensity of each of the pixels has a position that corresponds to the position of the pixel in the order.

9. A method comprising:
obtaining a plurality of training images that includes a reference image;
selecting a target region in the reference image;
selecting respective target regions in the other training images in the plurality of training images, wherein the respective target regions in the other training images correspond to the target region in the reference image, wherein the target region in the reference image and the respective target regions in the other training images each include a respective intensity profile;
selecting a pair of key points in the target region in the reference image, wherein selecting the pair of key points in the target region in the reference image is based, at least in part, on the respective intensity profile of the target region in the reference image;
selecting respective pairs of key points in the other training images, wherein the respective pairs of key points in the other training images correspond to the pair of key points in the target region in the reference image, wherein selecting the respective pairs of key points in the other training images is based, at least in part, on the respective intensity profiles of the respective target regions in the other training images; and
measuring respective distances between the key points in the pairs of key points in the training images.

10. The method of claim 9,
wherein selecting the pair of key points in the target region in the reference image is based, at least in part, on one or more derivatives of the respective intensity profile of the target region in the reference image, and
wherein selecting the respective pairs of key points in the other training images is based, at least in part, on one or more derivatives of the respective intensity profiles of the respective target regions in the other training images.

11. The method of claim 10, wherein the key points in the pair of key points in the target region include a local maximum of the one or more derivatives of the respective intensity profile of the target region in the reference image, a local minimum of the one or more derivatives of the respective intensity profile of the target region in the reference image, or a zero crossing of the one or more derivatives of the respective intensity profile of the target region in the reference image.

12. The method of claim 9, further comprising:
generating respective mappings between the reference image and the other training images,
wherein selecting the respective target regions in the other training images in the plurality of training images is based, at least in part, on the respective mappings between the reference image and the other training images.

13. The method of claim 9, further comprising:
obtaining a test image;
selecting a target region in the test image, wherein the respective target region in the test image corresponds to the target region in the reference image;
selecting a pair of key points in the target region in the test image;
measuring a distance between the key points in the pair of key points in the test image; and
detecting one or more anomalies in the test image based on the distance between the key points in the pair of key points in the test image and on the respective distances between the key points in the pairs of key points in the training images.

14. The method of claim 13, further comprising:
generating a statistical characterization of the respective distances between the key points in the pairs of key points in the training images,
wherein the one or more anomalies in the test image are detected based on the statistical characterization of the respective distances between the key points in the pairs of key points in the training images.

15. One or more computer-readable storage media storing instructions that, when executed by one or more computing devices, cause the one or more computing devices to perform operations comprising:
obtaining a reference image;
selecting a pair of key points in the reference image;
measuring a distance between the key points in the pair of key points in the reference image;

obtaining a test image;

selecting a pair of key points in the test image, wherein each key point in the pair of key points in the test image corresponds to a respective key point in the pair of key points in the reference image;

measuring a distance between the key points in the pair of key points in the test image; and detecting an anomaly in the test image based on the distance between the key points in the pair of key points in the test image and on one or more of the following: the distance between the key points in the pair of key points in the reference image, and a tolerance value.

16. The one or more computer-readable storage media of claim 15, wherein selecting the pair of key points in the reference image is based, at least in part, on a user input.

17. The one or more computer-readable storage media of claim 16, wherein selecting the pair of key points in the reference image includes:

obtaining training images;

selecting candidate key points in the training images;

measuring respective distances between pairs of candidate key points in the training images; and selecting the pair of key points in the reference image based, at least in part, on the distances between pairs of candidate key points in the training images.

18. The one or more computer-readable storage media of claim 17, wherein selecting the candidate key points in the training images includes:

selecting respective target regions in the training images, wherein each of the target regions includes a respective intensity profile, wherein selecting the candidate key points in the training images is based on one or more derivatives of the respective intensity profiles.

19. The one or more computer-readable storage media of claim 17, wherein detecting the anomaly in the test image is further based on the respective distances between the pairs of candidate key points in the training images.

20. The one or more computer-readable storage media of claim 15, wherein the operations further comprise:

obtaining training images;

selecting respective pairs of key points in the training images;

measuring respective distances between the pairs of key points in the training images; and generating a statistical characterization of the respective distances between the pairs of candidate key points in the training images, wherein detecting the anomaly in the test image is further based on the statistical characterization.

* * * * *